United States Patent [19]

Ellenby et al.

[11] Patent Number: 5,815,411
[45] Date of Patent: Sep. 29, 1998

[54] ELECTRO-OPTIC VISION SYSTEM WHICH EXPLOITS POSITION AND ATTITUDE

[75] Inventors: John Ellenby; Thomas William Ellenby, both of Palo Alto, Calif.

[73] Assignee: Criticom Corporation, San Francisco, Calif.

[21] Appl. No.: 119,360

[22] Filed: Sep. 10, 1993

[51] Int. Cl.$^6$ .............................. G09G 1/00; G09G 1/28; G01C 11/26
[52] U.S. Cl. ............................ 364/559; 364/449.1; 345/9
[58] Field of Search ..................................... 364/443, 449, 364/559, 578, 424.02; 395/118, 125, 127, 135, 133; 345/7, 8, 9; 348/115

[56] References Cited

U.S. PATENT DOCUMENTS

| 4,322,726 | 3/1982 | Collier et al. ............................ 340/705 |
| 4,380,024 | 4/1983 | Olofsson ................................. 348/115 |
| 4,489,389 | 12/1984 | Beckwith et al. ....................... 364/522 |

(List continued on next page.)

FOREIGN PATENT DOCUMENTS

05394517   7/1989   United Kingdom .

OTHER PUBLICATIONS

"*Mission Accomplished*", NASA Tech Briefs, Jul. 1993.
". . . Virtual Reality", San Diego Union Tribune, Bruce Biglow No Date.
"*NASA Vision*", Final Frontier, Mike Fisher, Aug. 1993.
"*Sextants in Space*", Wall Street Journal, Susan Carey, Jul. 20, 1993.
"*Digital Electronic Still Camera*", NASA Tech Briefs, Jun. 1993, Samual Holland and Herbert D. Yeates.
"*Mapping Wildfires in Nearly Real Time*", NASA Tech Briefs, Jun. 1993, Joseph D. Nichols, et al.
"*From the Ground Up*", Publish magazine, Jan. 1994, Stuart Silverstone.
"*Gyro sensed stereoscopic HMD*", Information display Dec. 1993.
"*Unveil Map Device*", Wall Street Journal No Author, No Date.
"*Lost? The little Box . . .*", Wall Street Journal No Author, No Date.

Primary Examiner—Emanuel T. Voeltz
Assistant Examiner—M. Kemper
Attorney, Agent, or Firm—Page Lohr Associates

[57] ABSTRACT

The present invention is generally concerned with electronic vision devices and methods, and is specifically concerned with image augmentation in combination with navigation, position, and attitude devices. In the simplest form, devices of the invention can be envisioned to include six major components: A 1) camera to collect optical information about a real scene and present that information as an electronic signal to; a 2) computer processor; a 3) device to measure the position of the camera; and a 4) device to measure the attitude of the camera (direction of the optic axis), thus uniquely identifying the scene being viewed, and thus identifying a location in; a 5) data base where information associated with various scenes is stored, the computer processor combines the data from the camera and the data base and perfects a single image to be presented at; a 6) display whose image is continuously aligned to the real scene as it is viewed by the user.

The present invention is a vision system including devices and methods of augmented reality wherein an image of some real scene is altered by a computer processor to include information from a data base having stored information of that scene in a storage location that is identified by the real time position and attitude of the vision system. It is a primary function of the vision system of the invention, and a contrast to the prior art, to present augmented real images and data that is continuously aligned with the real scene as that scene is naturally viewed by the user of the vision system. An augmented image is one that represents a real scene but has deletions, additions and supplements.

5 Claims, 6 Drawing Sheets

U.S. PATENT DOCUMENTS

| | | | |
|---|---|---|---|
| 4,645,459 | 2/1987 | Graf et al. | 395/127 X |
| 4,661,849 | 4/1987 | Hinman | 358/136 |
| 4,667,190 | 5/1987 | Fant | 340/747 |
| 4,682,225 | 7/1987 | Graham | 358/133 |
| 4,688,092 | 8/1987 | Kamel et al. | 358/109 |
| 4,807,158 | 2/1989 | Blanton et al. | 364/424.01 |
| 4,855,822 | 8/1989 | Narendra et al. | 358/103 |
| 4,872,051 | 10/1989 | Dye | 358/103 |
| 4,908,704 | 3/1990 | Fujioka et al. | 358/108 |
| 4,930,888 | 6/1990 | Freisleden | 356/152 |
| 4,937,570 | 6/1990 | Matsukawa et al. | 340/905 |
| 4,940,972 | 7/1990 | Mouchot et al. | 395/127 X |
| 4,970,666 | 11/1990 | Welsh et al. | 364/522 |
| 5,034,812 | 7/1991 | Rawlings | 358/108 |
| 5,072,218 | 12/1991 | Spero et al. | 345/8 X |
| 5,115,398 | 5/1992 | De Jong | 364/443 |
| 5,124,915 | 6/1992 | Krenzel | 364/420 |
| 5,133,050 | 7/1992 | George | 395/135 |
| 5,252,950 | 10/1993 | Saunders et al. | 345/9 |
| 5,296,854 | 3/1994 | Hamilton et al. | 345/9 X |
| 5,311,203 | 5/1994 | Norton | 345/7 |
| 5,322,441 | 6/1994 | Lewis et al. | 345/8 X |
| 5,353,134 | 10/1994 | Michel et al. | 359/52 |
| 5,394,517 | 2/1995 | Kalawsky | 395/129 |

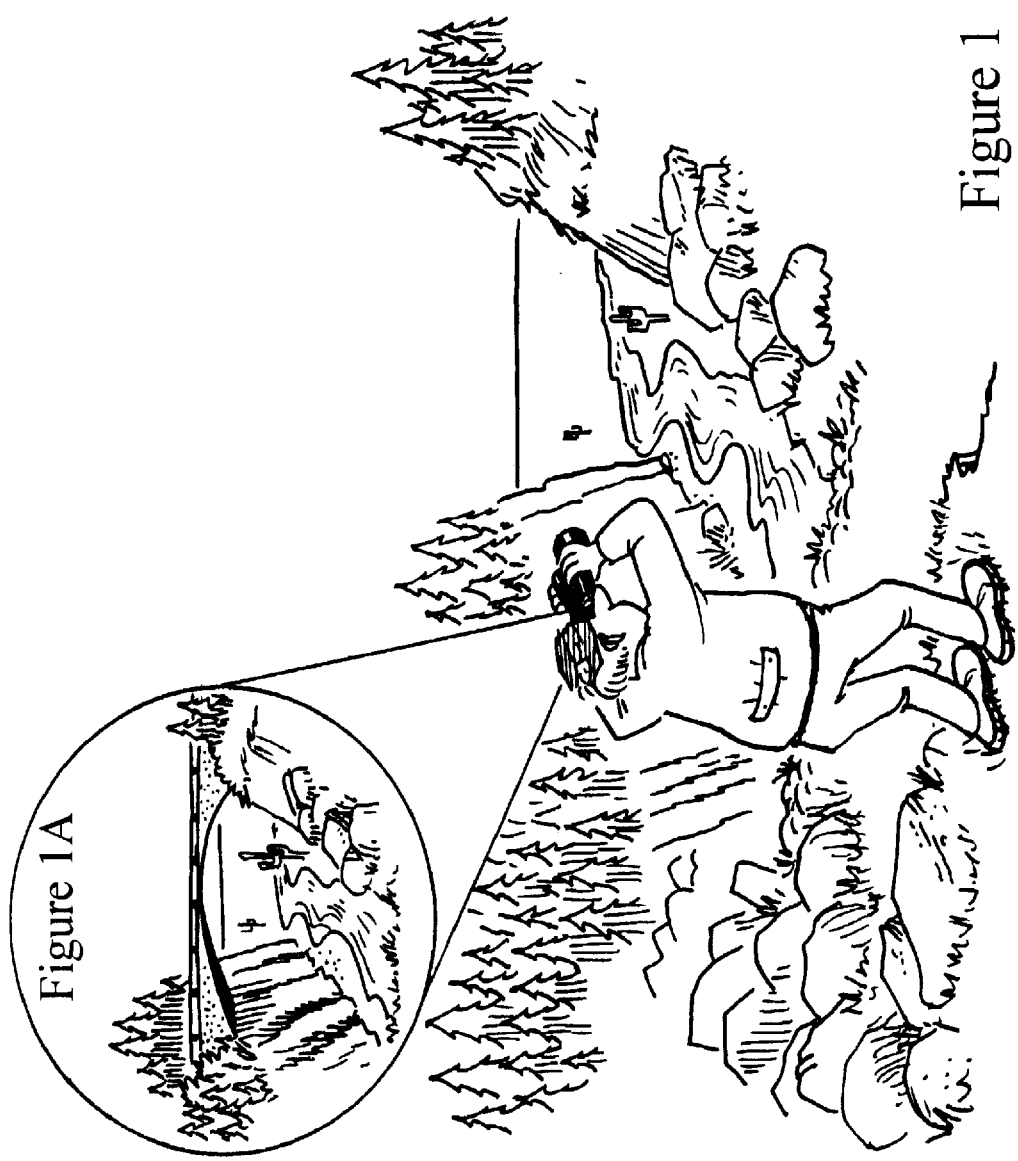

ELECTRO-OPTIC VISION SYSTEM WHICH EXPLOITS POSITION AND ATTITUDE

BACKGROUND OF THE INVENTION

The present invention is generally concerned with electronic vision devices and methods, and is specifically concerned with image augmentation in combination with navigation, position, and attitude devices.

One may have to look quite far into the annals of history to find the first uses of maps. Maps generally provide information to alert a user to things that are not readily apparent from simple viewing of a real scene from the users location. For example, a user of a city road map may not be able to see a tunnel on Elm street if the user is currently seven miles away on First street and looking in the direction of the Elm street tunnel. However, from the First street location, the user could determine from a road map that there is a tunnel on Elm street. He could learn that the tunnel is three miles long, starts on Eighth street and ends on Eleventh street. There may even be an indication of the size of the tunnel such that it could accommodate four traffic lanes and a bicycle lane.

Unfortunately, it is not always possible to translate the information from a map to the real scene that the information represents as the scene is actually viewed. It is common for users of maps to attempt to align the map to reality to get a better "feel" of where things are in relation to the real world. Those who are familiar with maps can verify that the fact that maps are drawn with north being generally in the direction of the top of the map, is of little use when translating the information to the scene of interest. Regardless of where north is, one tends to turn the map so that the direction ahead of the user, or in the direction of travel, in a real scene matches that direction on the map. This may result in the condition of an "upside down" map that is quite difficult to read (the case when the user is traveling south). Although translating the directions of the map to reality is a formidable task, it is an even greater problem to translate the symbols on the map to those objects in reality which they represent. The tunnel symbol on the map does not show what the real tunnel actually looks like. The fact that the appearance of the tunnel from infinitely many points of view is prohibitively difficult to represent on a map accounts for the use of a simple symbol. Furthermore, the map does not have any indication from which point of view the user will first see the tunnel, nor any indication of the path which the user will take to approach the tunnel.

It is now possible to computerize city road map information and display the maps according to the path taken by a user. The map is updated in "real-time" according to the progress of the user through the city streets. It is therefore possible to relieve the problem of upside-down maps as the computer could re-draw the map with the text in correct orientation relative to the user even when one is traveling in a southerly direction. The computer generated map is displayed at a monitor that can be easily refreshed with new information as the user progresses along his journey. Maps of this type for automobiles are well known in the art. Even very sophisticated maps with computer generated indicia to assist the user in decision making are available and described in patents such as DeJong U.S. Pat. No. 5,115,398. This device can display a local scene as it may appear and superimpose onto the scene, symbolic information that suggests an action to be taken by the user. For example, a left turn as is shown in FIG. 3 of the disclosure. Even in these advanced systems, a high level of translation is required of the user. The computer generated map does not attempt to present an accurate alignment of displayed images to the real object which they represent.

Devices employing image supplementation are known and include Head Up Displays, HUDs and Helmet Mounted Displays HMDs. A HUD is a useful vision system which allows a user to view a real scene, usually through an optical image combiner such as a holographic mirror or a dichroic beamsplitter, and have superimposed thereon, navigational information for example symbols of real or imaginary objects, vehicle speed and altitude data, et cetera. It is a primary goal of the HUD to maximize the time that the user is looking into the scene of interest. For a fighter pilot, looking at a display device located nearby on an instrument panel, and changing the focus of ones' eyes to read that device, and to return to the scene of interest, requires a critically long time and could cause a fatal error. A HUD allows a fighter pilot to maintain continuous concentration on a scene at optical infinity while reading instruments that appear to the eye to also be located at optical infinity and thereby eliminating the need to refocus ones' eyes. A HUD allows a pilot to maintain a "head-up" position at all times. For the airline industry, HUDs have been used to land airplanes in low visibility conditions. HUDs are particularly useful in a landing situation where the boundaries of a runway are obscured in the pilots field of view by fog but artificial boundaries can be projected onto the optical combiner of the HUD system to show where in the user's vision field the real runway boundaries are. The virtual runway projection is positioned in the vision field according to data generated by communication between a computer with and the airport instrument landing system, ILS which employs a VHF radio beam. The system provides the computer with two data figures. First a glide slope figure, and second, a localizer which is a lateral position figure. With these data, the computer is able to generate an optical image (photon) to be projected and combined with the real scene (photon) that passes through the combiner and thereby enhancing certain features of the real scene; for example runway boundaries. The positioning of the overlay depends on the accuracy of the airplane boresight being in alignment with the ILS beam and other physical limitations. The computer is not able to recognize images in the real scene and does not attempt to manipulate the real scene except for highlighting parts thereof. HUDs are particularly characterized in that they are an optical combination of two photon scenes. The combination being a first scene, one that is normally viewed by the users eyes passes through an optical combiner, and a second, computer generated photon image which is combined with the real image at an optical element. In a HUD device it is not possible for the computer to address objects of the real scene, for example to alter or delete them. The system only adds enhancement to a feature of the real image by drawing interesting features thereon. Finally, HUDs are very bulky and are typically mounted into an airplane or automobile and require a great deal of space and complex optics including holograms and specially designed lenses.

Helmet Mounted Displays HMDs are similar to HUDs in that they also combine enhancement images with real scene photon images but they typically have very portable components. Micro CRTs and small combiners make the entire system helmet mountable. It is a complicated matter to align computer generated images to a real scene in relation to a fast moving helmet. HUDs can align the data generated image that is indexed to the slow moving airplane axis which moves slowly in relation to a runway. For this reason, HMDs generally display data that does not change with the pilots head movements such as altitude and airspeed. HMDs suffer the same limitation as the HUDs in that they do not provide the capacity to remove or augment elements of the real image.

Another related concept that has resulted in a rapidly developing field of computer assisted vision systems is known as virtual reality, VR. Probably best embodied in the fictional television program "Star Trek; The Next Generation", the "Holodeck" is a place where a user can go to have all of his surroundings generated by a computer so as to appear to the user to be another place or another place and time.

Virtual reality systems are useful in particular for a training means. For example in aircraft simulation devices. A student pilot can be surrounded by a virtual "cockpit" which is essentially a computer interface whereby the user "feels" the environment that may be present in a real aircraft, in a very real way and perhaps enhanced with computer generated sounds, images and even mechanical stimuli. Actions taken by the user may be interpreted by the computer and the computer can respond to those actions to control the stimuli that surround the user. VR machines can create an entire visual scene and there is no effort to superimpose a computer generated scene onto a real scene. A VR device generally does not have any communication between its actual location in reality and the stimuli being presented to the user. The location of the VR machine and the location of the scene being generated generally have no physical relationship.

VR systems can be used to visualize things that do not yet exist. For example, a home can be completely modeled with a computer so that a potential buyer can "walkthrough" before it is even built. The buyer could enter the VR atmosphere and proceed through computer generated images and stimuli that accurately represent what a home would be like once it is built. In this way, one could know if a particular style of home is likable before the large cost of building the home is incurred. The VR machine being entirely programmed with information from a designer does not anticipate things that presently exist and there is no communication between the elements presented in the VR system to those elements existing in reality.

While the systems and inventions of the prior art are designed to achieve particular goals, features, advantages, and objectives, some of those being no less than remarkable, these systems and inventions have limitations and faults that prevent their use in ways that are only possible by way of the present invention. The prior art systems and inventions can not be used to realize the advantages and objectives of the present invention.

SUMMARY OF THE INVENTION

Comes now, an invention of a vision system including devices and methods of augmented reality wherein an image of some real scene is altered by a computer processor to include information from a data base having stored information of that scene in a storage location that is identified by the real time position and attitude of the vision system. It is a primary function of the vision system of the invention, and a contrast to the prior art, to present augmented real images and data that is continuously aligned with the real scene as that scene is naturally viewed by the user of the vision system. An augmented image is one that represents a real scene but has deletions, additions and supplements. The camera of the device has an optical axis which defines the direction of viewing as in a simple "camcorder" type video camera where the image displayed accurately represents the real scene as it appears from the point of view of one looking along the optical axis. In this way, one easily orients the information displayed to the world as it exists. A fundamental difference between the vision system of the invention and that of a camcorder can be found in the image augmentation. While a camcorder may present the superposition of an image and data such as a "low battery" indicator, et cetera, it has no "knowledge" of the scene that is being viewed. The data displayed usually is related to the vision device or something independent of the scene such as the time and date. Image augmentation of the invention can include information particular to a scene being viewed with the invention.

The vision system of the invention can include a data base with prerecorded information regarding various scenes. The precise position and attitude of the vision system indicates to the data base, the scene that is being viewed. A computer processor can receive information about the particular scene from the data base and can then augment an image of the scene generated by the camera of the vision system and present a final image at the display with includes a combination of information from the optical input and information that was stored in the data base. Particularly important, is the possibility of communication between the data from the data base and the real image. Analyzing and processing routines may include recognition of items in the real scene and comparisons with artifacts of the stored data. This could be useful in alignment of the real images to the recalled data. In a situation where the optical input of a scene is entirely blocked from the camera of the system, for example by dense fog, an image of the scene can be generated which includes only information from the data base. Alternatively, the data base being of finite size may not have any information about a particular scene. In this case, the image presented at the display would be entirely from the optical input of the real scene. This special case reduces the vision system to the equivalent of a simple camcorder or electronic binocular. It is also a very special case where the features of a real scene are selectively removed. If the bright lights of a city-scape obstruct the more subtle navigation lights of a marine port of entry, then it is possible for the processing routines to discriminate between the city lights and the navigation lights. The undesirable city lights could be removed in the processor before the final image is displayed. In the final image, the important navigation lights show clearly and the city lights are not present at all. Therefore, a final image of the invention can be comprised of information from two sources, in various combinations, superimposed together to form a single, high information-density image. The information of the two sources are compared and combined together to form a single augmented image that is presented at a display and is aligned to the real scene as the scene is viewed by the user.

In the simplest form, devices of the invention can be envisioned to include six major components: A 1) camera to collect optical information about a real scene and present that information as an electronic signal to; a 2) computer processor; a 3) device to measure the position of the camera; and a 4) device to measure the attitude of the camera (direction of the optic axis), thus uniquely identifying the scene being viewed, and thus identifying a location in; a 5) data base where information associated with various scenes is stored, the computer processor combines the data from the camera and the data base and perfects a single image to be presented at; a 6) display whose image is continuously aligned to the real scene as it is viewed by the user.

The camera is related to the position measuring device and the attitude measuring device in that the measurements of position and attitude are made at the camera with respect to arbitrary references. The position and attitude measurement means are related to the data base in that the values of those measurements specify particular data base locations where particular image data are stored. We can think of the position and attitude measurements as defining the data base pointer of two orthogonal variables. The camera is related to the computer processor in that the image generated at the camera is an electronic image and is processed by the computer processor. The data base is related to the computer in that the data base furnishes the processor information including images for use in processing routines. The display is related to the computer as it receives the final processed image and converts the computers electric image signal into an optical image that can be viewed by the user. The display is boresight aligned with the optical axis of the camera such that the information corresponds to reality and appears to the user in a way that allows the user to view the final augmented image without needing to translate the image to the orientation of the real scene.

In the simplest form, methods of the invention can be envisioned to include seven major steps: An 1) acquire step whereby the light from a scene is imaged by a lens; a 2) conversion step whereby optical information of the acquire step is converted into an electrical signal; a 3) position determining step in which the position of the camera is measured; an 4) attitude determining step in which the attitude of the camera is measured; a 5) data recall step where a data location is selected in accordance with the measurements in steps 3 and 4 and user impute data, is recalled by a computer processor; a 6) processing step wherein data from the data store and the electronic image are combined and processed; and a 7) display step wherein a processed final image is displayed.

The product of the acquire step, an optical image, is converted to an electric signal in the conversion step. The electronic image of the conversion step is transmitted to the processor in the processing step. The products of the position determining step and attitude determining step are values that are used in the data recall step. The result of the data recall step is also transmitted to the processor to be combined with the electronic image of the conversion step in the processing step. The product of the processing step, a final electronic representation of an augmented image is transmitted to, and displayed in, optical format in the display step.

The invention will be summarized further by presenting six examples of the invention wherein a description of the devices, methods, and uses thereof, follow.

In a first summary example of the invention, the reader is to imagine a scenario where a boat is approaching a port of entry and the user of the invention is a navigation officer of that boat. It is quite common for a navigation officer to require many aids to guide his course through a shipping channel. Charts, a compass, lighted buoys, sonic devices, ranges, radar, binoculars are some of the instruments that one may use to navigate a boat. Recent advances in position determining technologies, in particular the Global Positioning System, or GPS, have simplified the task of navigation. With the GPS, a navigation officer can rely on knowing the position of the craft to within approximately ±300 feet, north and east; and in some special cases within less. Even with such a good position determination, the navigation officer must locate where on the chart his position corresponds, and identify symbols on the chart to create a mental image of his surroundings. Then the navigation officer must look about at the real scene before him for identifiable objects to determine how what he sees corresponds to the symbols on the chart. Frequently, visibility is limited by darkness or weather conditions and particular lights must be recognized to identify chart markings. These can be colored flashing lights and can easily be mistaken for the bright lights of a city skyline. In other cases, the markers may be un-lit and may be impossible to find in the dark. Dangerous objects, for example sunken ships, kelp, and reefs, are generally marked on the chart but can not be seen by the navigation officer because they can be partially or entirely submerged. The navigation officer must imagine in his mind his position with respect to objects in the real scene and those on the chart and must also imagine where in the real scene that the chart is warning of dangers. This procedure requires many complex translations and interpretations between the real scene, the markers of the chart, the scene as it is viewed by the navigation officer, and the chart as understood by the navigation officer. Obviously, there is great potential for mistakes. Many very skilled and experienced naval navigators have failed the complicated task of safely navigating into a port resulting in tragic consequences. With the system of the invention, a navigation officer can look with certainty at a scene and locate exactly, known marks. The system of the invention eliminates the need for determining where in a real scene the symbols of a chart correspond. The user of the invention can position the display between his eyes and the real scene to see an image of the real scene with the symbols of a chart superimposed thereon. In the navigator's mind it becomes very concrete where the otherwise invisible reefs are located and which lights are the real navigation lights and which lights are simply street lights. It is possible for the computer to remove information such as stray lights from the image as it is recorded from the real scene and to present only those lights that are used for navigation in the display. This is possible because the data base of the invention "knows" of all navigation lights and the processor can eliminate any others. The display that the user views includes a representation of a scene with complicated undesirable objects removed and useful data and objects being added thereto. Whenever the navigator points the device of the invention in some direction, the device records the optical image of the real scene and simultaneously determines the position and attitude of the device and calls on a data base for information regarding the scene being observed. The processor analyzes the image and any data recalled and combines them to form the final displayed image.

In a further summary example of the invention, a city planning commission may wish to know how a proposed building may look in the skyline of the city. Of course it is possible to make a photograph of the skyline and to airbrush the proposed building into the photograph. This commonly used method has some shortfalls. It shows only a single perspective of the proposed building that may be presented in the "best light" by a biased developer (or "undesirable light" by a biased opponent/competitor). The building may be presented to appear very handsome next to the city hall as shown in the developer's rendition. Since only one perspective is generally shown in a photograph, it may be impossible to determine the full impact the building may have with respect to other points of view. It may not be clear from the prepared photograph that the beautiful bay view enjoyed by users of city hall would be blocked after the building is constructed. With the current invention, the details of every perspective could be easily visualized. Data that accurately represents the proposed building could be entered into a data base of a device of the invention. When the camera of the invention is pointed in the direction of the new building, the camera portion records the real scene as in appears and transmits that signal to a processor. The device accurately determines the position and attitude of the camera with respect to the scene and recalls data from the data base that properly represents the perspective of the building from that point of view. The processor then combines the real scene with the data of the proposed building to create a final image of the building from that particular perspective. It would even be possible for a helicopter to fly in a circle around the location of the building and for a user to see it from all possible points of view. A council member could see what the future structure would be like in real life from any perspective before voting to approve the plan.

In a still further summary example, we choose a scenario where an engineer uses products of the invention for analysis and troubleshooting of an engineering problem. In particular, the case where a problem has been detected in the plumbing aboard a submarine. The complicated works including pipes, tubes, pumps, cables, wires, et cetera, of a submarine may be extremely difficult to understand by looking at a design plan and translating the information from the plan to the real world. Immediate and positive identification of a particular element may be critical to survival of the ship in an emergency. The following illustrative engineering use of the invention provides for a greatly simplified way of positive identification of engineering features.

An engineer aboard a submarine is tasked to work in the torpedo room on a saltwater pump used to pump down the torpedo tubes after use. In preparation for the job, the data base of a portable electro-optic vision device is updated from the ship's central computers with information regarding the details of the pump in question and of the details of the torpedo room where the pump is located. In the event of a battle damaged ship or in case of limited visibility due to fire or power outages, the vision device can provide guidance to the location of the pump through visual and audio clues. As the various pipes may be routed through bulkheads and behind walls, the vision system can be used to see through walls and to "fill-in" the locations of the pipes so that the otherwise hidden pipe can be followed continuously and without ambiguity. Upon arriving at the pump in question, the engineer points the camera axis of the vision device in the direction of the pump. In the display of the device, a real image of the pump is superimposed with data such as the part number of the pump and clues to features of the pump such as the type of material being pumped and flow direction. The vision device can receive inputs from the user to select advance display modes. This input may be made by way of mechanical devices like a "mouse", or a simple button, or may be verbal commands that are recognized electronically by speech recognition means. If the pump is to be disassembled, the user may be able to instruct the device to display sequential disassembly steps by a verbal "step" command. Disassembly could then be simplified by clues provided by the vision system's display. A particular part can be highlighted and the motion required for its proper removal can be simulated such that the user can learn the correct disassembly procedure in real time. Similarly, re-assembly can be expedited because prior knowledge of the reassembly sequence rests in the data base and is easily presented to the user in a way that does not require translation from a parts book to reality. A highlighted part and the motion to assemble that part can be superimposed onto a real image of the workpiece.

In a still further summary example, one can imagine the complexity of a situation where a structure fire is being fought. It may be typical for a fire captain to be reading the detailed features of the building interior from a blueprint and to transmit that information by radio to firefighters on the inside of the building. The problem with this method is that it depends on multiple translations between various media. With each translation, the information is distorted according to some transfer function thus limiting its accuracy. The present invention offers an alternative which allows detailed information of a structure to be directly displayed to a firefighter inside the building.

A video camera and goggle set could be installed into a standard firefighter helmet, the goggle set having therein, the requisite display. The display unit would be in communication, either by hard wire or radio, to a computer processor that is also in communication with a data store having information prerecorded therein regarding features of the structure. A locating system could determine at all times where the firefighter is positioned and where she is looking. A real image from the camera can then be combined with the recorded data to realize a final augmented image. If the bright light generated by the fire in the real image is blocking important features such as a door handle, the processor can delete the fire from the scene and "draw-in" the door handle. The firefighter could easily navigate her way through a complicated building interior full of smoke and fire that would otherwise prohibit ones progress through that building. First hand information provided by a vision system of the invention directly to a firewoman can greatly increase the speed and effectiveness of fire fighting tasks. A device mounted into a helmet would necessarily be small and compact. It may be arranged such that the camera, display, and the locating (position and attitude) means are in radio communication with a computer and processing means that may be bulky but located remotely. This possibility is considered to be a subset of, and included within, the scope of the invention.

It should be pointed out that in the case of very heavy smoke where no useful real image can be detected by the camera and the displayed image is consists entirely of data from the data store, the system becomes quite similar to the virtual reality devices. The critical distinction is that the images displayed are exactly aligned to reality and oriented to the direction in which the user is looking. If the firefighter pushes on a door, a real door will open. In VR applications, it will appear and feel like a real door is being opened, but the door of a VR system is completely simulated and there is no real door being opened.

In a still further summary example, to provide a viewing device that allows a tourist to "see" into a previous time. One can imagine a bus load of tourists arriving at he grounds of Pompeii. Each person equipped with portable vision system could be free to roam the grounds at will. It is possible to have predetermined points where the user could be directed and to have a sound track that corresponds to the scenes as presented to the user. Looking into the display of the vision system a user can see the buildings as they are now and a simulation of how they appeared prior to the eruption of Mt. Etna. He sees a simulation of people going about their daily lives in ancient Pompeii. Without warning, the viewer sees the ash falling on the buildings and people running for cover. The simulated events of the past can be easily viewed in a modem time with provisions of the present invention. In this version, each portable device can be in radio communication with a shared data and processing center that communicates with each individual personal device independently.

In a final summary example of the invention, we consider the need for surveyors to "see" into the ground to locate pipes and wires that have been buried. When construction projects require that such pipes and wires be removed or altered, or new projects to be installed such that they do not interfere with existing works, then surveyors must attempt to locate those works. A surveyor relies on documentation of the previous construction projects and attempts to plot onto the real world the locations of the various works as indicated by those maps. Again, the surveyors translation from maps and other documentation to the real world and to the operators of the digging equipment require skill and experience. Even with recent and accurate maps, the task can become a nightmare and failures very expensive. If one could look at a display aligned to the real scene which included an image of the scene and superimposed thereon the positions of the buried works, then it would be a trivial matter to mark the locations for caution. With the system of the invention, the buried pipes, and wires, et cetera, could be recorded in the data base. The locations of construction projects could then be surveyed in a very short time.

It should be noted that most mapping systems of the art, even very sophisticated computerized maps with data and data symbols combined with images, require a translation of the presented image to the images of the real world as viewed by a user. Although HUDs combine a real image and data images that are aligned to reality, the invention can be distinguished in that it has the capacity for communication between the real image and the data or data images. They cannot provide for recognition, alignment, undesirable feature extraction, and others advanced features of the invention. Only the present invention provides a system of producing augmented images aligned to a scene as the scene is naturally viewed.

It is a primary object of the invention to provide a versatile vision system having capabilities completely unknown to systems in the art.

It is a further primary object of the invention to introduce to surveying, engineering, touring, navigation and other arts, a device and method of augmented reality whereby a real scene is imaged with augmentation which provides additional information about the scene to the user.

It is a further object of the invention to provide a vision system for seeing a topography that includes objects that do not exist at the time of use, but are intended to be a part of the scene in some future time.

It is a further object of the invention to provide a vision system for seeing a topography that includes objects that can not be seen in conventional viewing systems including cameras, binoculars, telescopes, video recorders, head up displays, helmet mounted displays, et cetera.

It is a still further object of the invention to provide a vision system that allows undesirable objects of a real scene to be removed and replaced with computer generated objects to represent objects that are important to the user.

BRIEF DESCRIPTION OF THE DRAWINGS

These and other features, aspects, and advantages of the present invention will become better understood with regard to the following description, appended claims and drawings where:

figure one is a drawing of a user of the invention, a scene as it appears in reality, and the scene as it appears in the augmented display of the device of the invention;

Figure 2A:
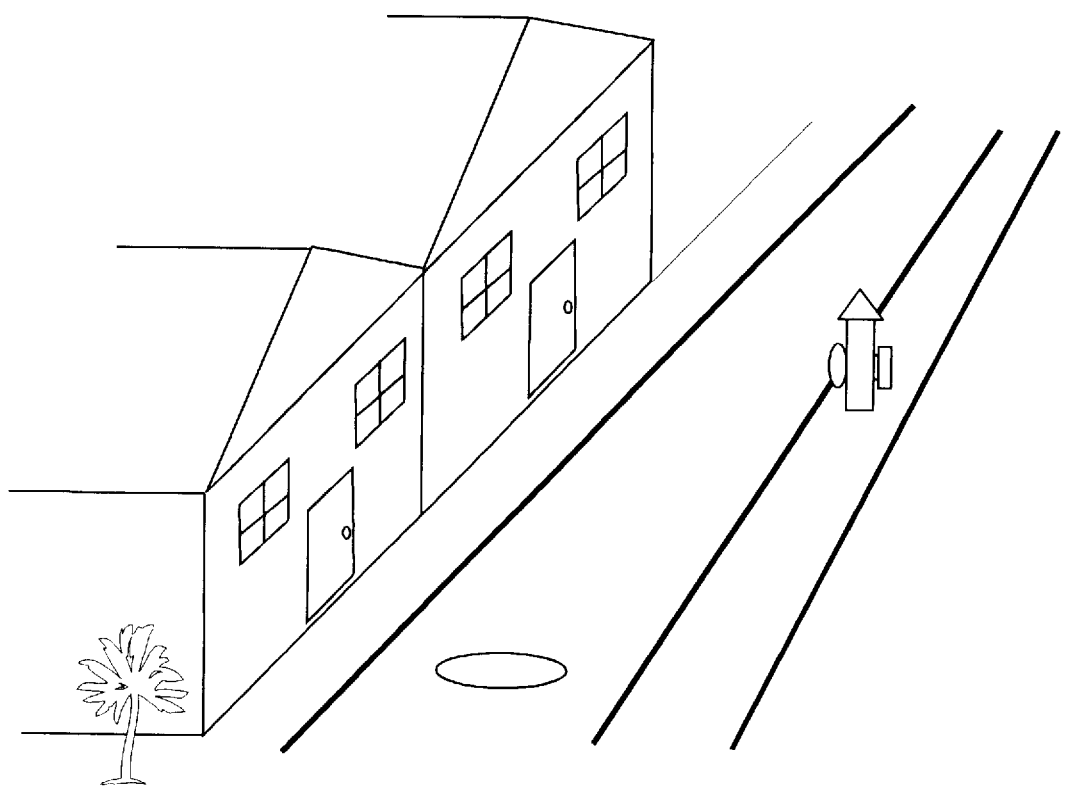
Figure 2B:
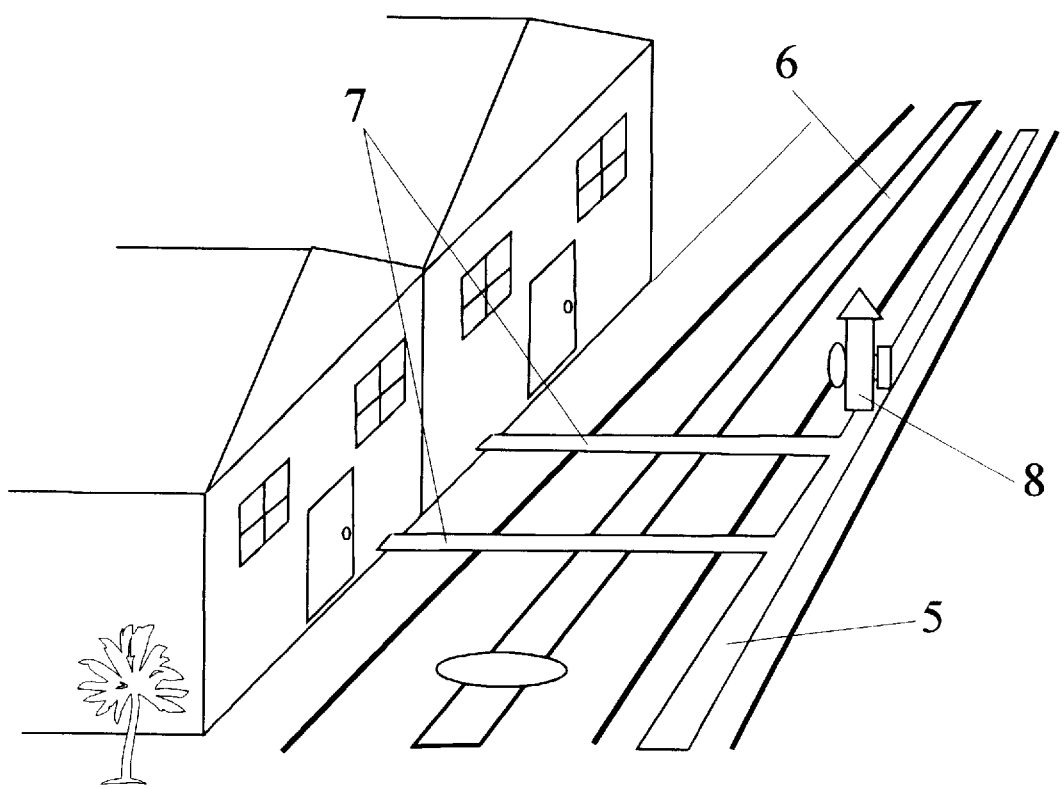
Figure 3:
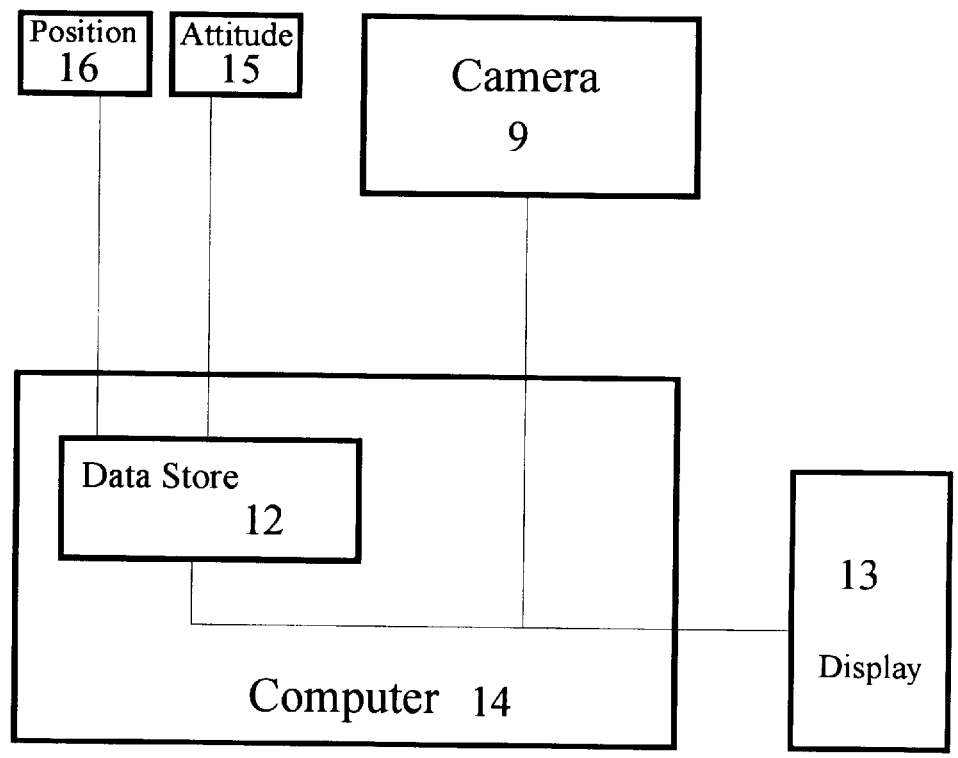
Figure 4:
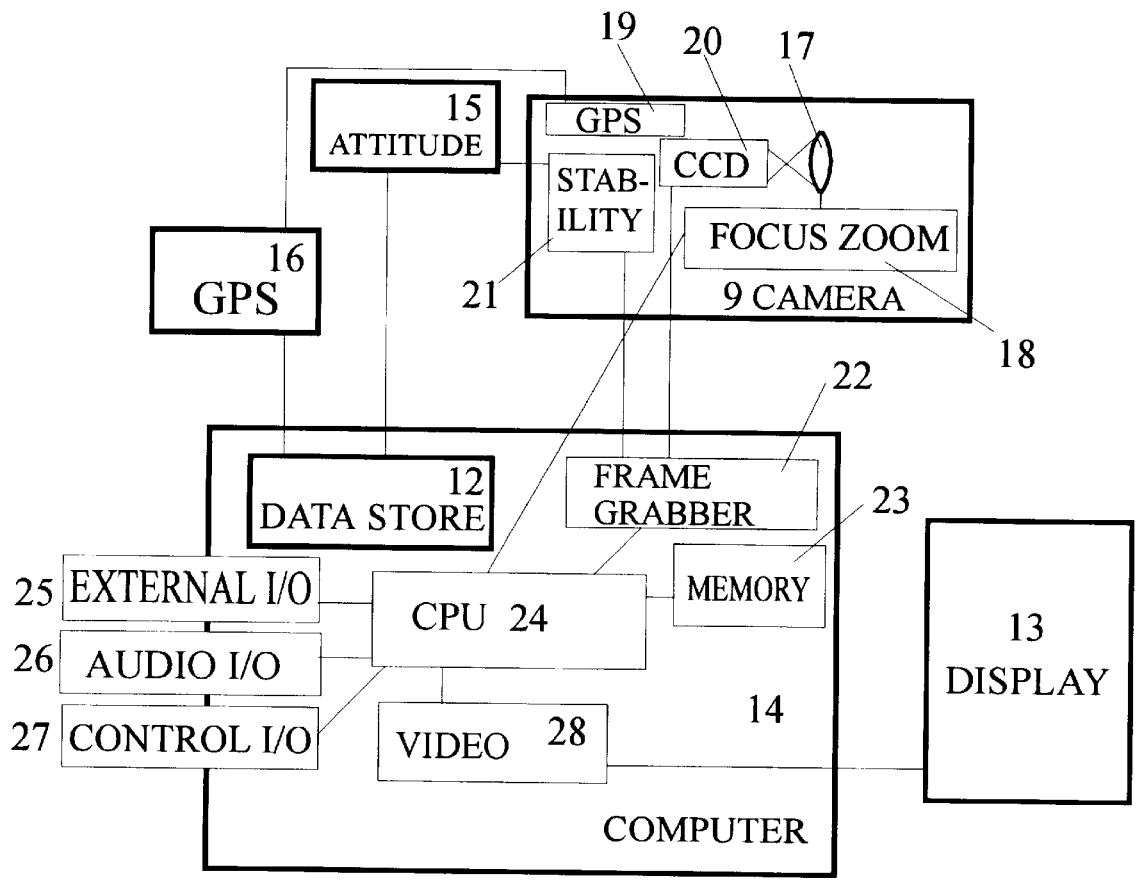
Figure 5:
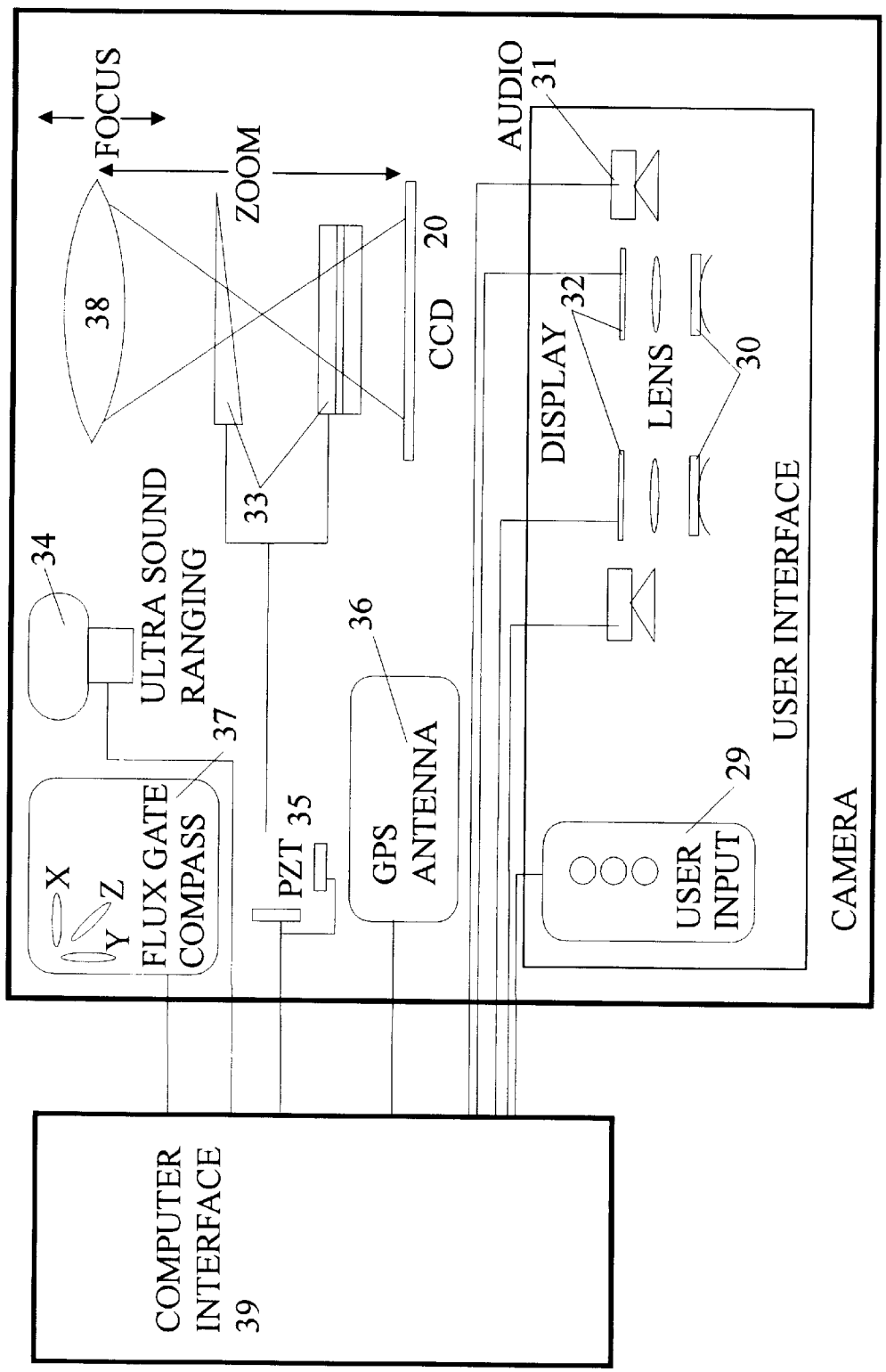

figure two is a drawing of a city street scenario (2a) whereby the invention allows a surveyor to see otherwise invisible features such as buried pipes and sewer lines (2b);

figure three is a block diagram arrangement of components and their relationship to each other that sets forth the novel combination of the invention;

figure four is a further detailed block diagram;

figure five is a electro-optical schematic drawing of some of the system components.

PREFERRED EMBODIMENTS OF THE INVENTION

The invention provides for a vision system device operable for producing an augmented image. In drawing figure one, a user 2 is shown to be looking into a canyon through a portable assembly 1 of the invention. An augmented image 3 is presented to the user and is aligned with the real scene. The augmented image may include: elements that do not yet exist, for example a bridge 4, representing information added to a real scene; elements that exist in the real scene but do not appear in the final image, for example trees at the right side of the bridge, representing information that has been deleted; and elements that have been changed from their actual appearance. In drawing figure two, the example of construction site surveying is illustrated. A scene as viewed normally would look like figure two(a). In figure two(b), the fresh water pipes 5 leading to homes 7 and fire hydrants 8 and the buried sewer lines can be easily "seen" in the display of the invention.

In a first preferred embodiment of the invention, an electro-optic apparatus comprising a camera 9, a position determining means 16, an attitude determining means 15, a data store 12, a computer 14, and a display 13; the camera being an electro-optic device operable for converting a photon input from a field of view, into an optical image at an image field and operable for converting that photon image into an electronic image and operable for transmitting that electronic image to the computer, the positioning means being operable for determining the position of the camera, the attitude means being operable for determining the camera pointing attitude of the camera defined by the symmetry axis of the camera field of view, the data store being in communication with the position and attitude determining means whereby the values of position and attitude indicate a location or locations in the data store being further in communication 39 with the computer whereby image data can be transmitted thereto, the computer whereby the electronic image from the camera and the electronic image 4 of the data store are compared, analyzed, processed and combined for display as a single image, the computer being in communication with, the display, whereby camera position and attitude information particular to the scene are used to augment a real image of a scene that is particular to the position and attitude of the camera, is provided. A detailed description of each of the main device elements follows.

camera

In preferred embodiments of the invention it is anticipated that the camera portion of the device will be comprised of four main subsystems integrated together into a portable assembly 1 that is easy for a user 2 to hold. These include: an optical input lens assembly 38, an image stabilization system, at least one charge coupled device, CCD 20, and an optical ranging system 34.

A photon input imaging lens assembly can be mounted into the portable camera unit 1. Single axis, or "monocular" systems are commercially available and are commonly used in devices such as camcorders and digital photographic cameras. It is preferred that the lens have a zoom and autofocus capability; these systems are well developed in the art. An autofocus system can be computer driven but releasable for user override. Lens zoom operations can also be power driven and controlled manually by the user at an electronic control switch, or could be driven by the computer based on known features particular to a chosen scene. The physical dimensions of the input lens define the field of view of the device which is variable with the zoom properties of the lens. Information regarding the field of view can be supplied to the processor to be used in image combination routines.

Image stabilization systems are also well developed in the electronic imaging arts and the known systems are useful for preferred embodiments of this invention. Image stabilization can be realized by way of solid state piezo-electric devices to drive a distortable prisms. Motion information from sensitive gyros 35 could detect movements and provide a driving signal to the prisms. The system of the invention can be modified so that output from each of the gyros is made available to the control computer for calculations of the attitude and position of the portable assembly. This can be particularly important for systems not having access to a GPS signal, for example in a submarine or in a system designed for microscale applications such as surgery or micro manipulation. As an alternative to mechanical stabilization systems, an electronic image stabilization system could be used but there could be a loss of image quality and, in certain situations of rapid motion, a loss of continuity in image input. Also, an electronic image stabilization system could not be readily modified to provide motion information to the control computer.

After the photon optical input from a scene is stabilized by the image stabilization system, it is then focused onto at least one charged coupled device, CCD, that is positioned in the image plane of the input lens. A possible alternative could be a silicon intensified camera or other image-con device but CCDs are preferred because their output can be compatible with electronic computers using digital data. The light field from the scene is converted to a digital electronic image signal which represents the scene. CCD devices are also quite commonly available and used in modern imaging devices and standard CCDs are sufficient for use in the present invention without modification or with only minor changes. The camera can be color sensitive and two common methods for producing color images are possible. It is also anticipated that CCD devices that are sensitive to portions of the spectrum other than the human-visible region may be useful. For example some systems may benefit from CCD devices that are tuned for infrared IR imaging. Use of IR devices may be important for applications such as fire fighting and agronomy where the important image information may be in a spectrum other that the visible region.

A ranging system is useful for a plurality of system functions. A first system function is to provide for the focus of the input lens. For images to be properly focused onto the CCD, it is necessary to adjust the input lens according to the distance of the objects being imaged. As a second system function, range information is also useful in the processing stage as it gives hints to the proper scaling of the real image with respect to the data from the data store. The camera image and data store inputs will be combined such that scale is an important consideration for proper appearance of the final image. A further use, a third use of optical ranging can be to eliminate unwanted image features. For example, if a ship's rigging tends to block the view of the shore, then it is possible to input to the image processor the range that is of interest. The processor can then remove objects that are not within the selected range.

A ranging system, for example a sonic or ultrasound device, can measure the distance from the camera to the objects of a scene; the range. It is also possible to use laser or radar systems but they tend to be more complicated and more expensive. The computer can receive range information directly from a ranging system or can receive range information from the focus position and zoom condition 18 of the input lens that can be interrogated by a computer routine. This is possible if the lens is designed with transducer devices that convert the focus and zoom lens conditions into electronic signals that are readable by the computer. As an alternative to active ranging systems or as a supplement to, it is possible to determine the range to objects of a scene from comparisons of image features to known elements in the data base that correspond to those image features. A disclosure of this method is presented in U.S. Pat. No. 5,034,812, Rawlings. Once position and attitude of the portable camera is established, a real image may be input and analyzed by the computer. By reference to a computerized topographic data base, the position and therefore distance and bearing to user selected features may be established. An example; an object such as a lighthouse whose height was previously stored in the data base may be measured from the real image where the magnification conditions of the lens are known thereby making a range determination possible. Each of the ranging measurements may be made independently or in combination with a plurality of other measurements to increase accuracy.

position determining means

In preferred embodiments of the invention it is anticipated that the position determining means of the device will be a Global Positioning System GPS receiver 16. There are many alternative positioning systems that could be used effectively for other embodiments. These include, but are not limited to, Loran, Glonass, and Omega. Since GPS has very high accuracy and has altitude capability, it is an obvious choice for the invention which benefits from the extra precision of that system. In self contained environments like subterranean or a submarine, the positioning means may have to be a simplified version of triangulation from known locations or other positioning determination means. For applications on a microscale, for example semiconductor inspection or microdevice manufacture, it may be useful to have a laser interferometer position measurement means that has accuracy at the sub-nanometer level. The invention does not depend on the particulars of any positioning means just so that the position can be determined and input into a computer processor.

One objective of the invention is to have a small, lightweight, portable camera. To achieve this, it may be necessary to put the bulk of the computing power in a separate unit that is in communication with the portable camera. In this embodiment, the antenna 36 for the GPS receiver would be preferably put within the portable camera or in close proximity thereto, and the more bulky processing portion of the GPS receiver could be combined with other system computing facilities in a backpack or ground unit. For units to be used in obstructed locations where a GPS signal may not be available such as within the bridge of a ship, the antenna can be placed in some known position relative to the portable camera and the known and constant displacement therebetween removed in the processing electronics.

attitude determining means

In preferred embodiments of the invention it is anticipated that the attitude determining means of the device will be one of three alternatives. Each provides the heading, tilt and roll of the portable camera unit. A flux gate compass 37 located within the portable camera provides heading information to an accuracy of ±1 degree. The output from this flux gate compass can be made available to the computer. Outputs from piezo-electric gyros located in the image stabilization system can also be used by the computer to calculate motion from a datum established by the user. The datum can be from rest in a known level position or can be established by observing the horizon by looking through the portable camera. An alternative is a triaxial magnetometer system incorporating a biaxial electrolytic inclinometer. This transducer is located within the camera and is operable for providing the computer with a complete attitude determination. It is a further alternative to compute attitude (including heading) from a known datum using the piezo-electric gyros. Selection of this alternative may be for reasons of lowered cost as well as permitting application where magnetic fields may preclude accurate heading readings ( i.e. close to electric arc welding equipment; large transformers and etc.) Note that since the image stabilization system already contains the required piezo-electric gyros, it would be possible and desirable to provide this alternative as an optional method for establishing headings in all above alternatives. computer In preferred embodiments of the invention it is anticipated that the computer processor of the device will be a microcomputer with very fast graphic and video abilities. Because of the advanced state of computer development, many of the necessary elements of a computer, for example fast frame grabbers 22 and massive cache memories 23, have already been developed. The computers and software used in video games and computer generated animation applications lend themselves to the tasks at hand and can be readily be converted to those tasks. As the functions of the present invention are very unique, the necessary software to achieve those functions will also necessarily be unique. It is anticipated that the complicated system instruction set design, either implemented in hardware such as ROM or in software, will be proprietary. It is likely to have task specific instruction sets and to have many devices of the invention each having their own particular instruction set.
data store In preferred embodiments of the invention it is anticipated that the data store means of the device will be a mass memory device; for example a CD-ROM. The data store can have pre-programmed information regarding particular scenes that are of interest to a specific user. The position determining means and the attitude determining means control the pointer of the data store. In the simplest embodiment, the data store has locations defined by an orthogonal array of two variables. The values of position $P_n$ and of attitude $A_n$ uniquely define a corresponding scene SCENE$\{P_n, A_n\}$. In advanced versions, the range can also be important and a range variable, a third orthogonal variable defines a three dimensional array: SCENE$\{P_n, A_n, R_n\}$ The variable defined by R tells the computer in which plane normal to the axis of the camera, lies the information of interest. In even further advanced versions, a magnification variable $M_n$ can be similarly used to give a four dimensional array: SCENE$\{P_n, A_n, R_n, M_n\}$. Many other factors can be used to control the way that data is stored and recalled. Each of the methods being particular to the task at hand, are subsets of the general case where data regarding a scene is selected from a data store in accordance to identification of the scene being viewed.
display In preferred embodiments of the invention it is anticipated that the display 13 means of the device is a common active matrix LCD 32 device. These are currently the brightest, fastest displays available and are quite commonly used in conjunction with video applications. Alternatively, it is possible to use plasma display, electroluminescent, or any of several possible displays. The particular type of display is not important and may be application specific without deviating from the gist of the invention. An important feature of the display is that an electronic signal generated from a computer video card 28 can be converted into a optically viewable image that represents an augmented real image of the scene that the camera is addressing. It is also a major feature of the invention to have the display oriented with reality and therefore aligned with respect to the optical axis of the camera as is shown in FIG. 1.
other In preferred embodiments of the invention it is anticipated that the device can also include such apparatuses such as user input control keys 29 to interact with the computer routines and to specify information that drives further computer routines; audio transducers 31 both input types such as microphones and output types such as speakers also for control of computer routines and for presentation of information to a user. Standard equipment known to couple vision devices to human users and physical conditions such as a tripods, lens shades, eyepiece fixtures 30, et cetera are all considered to be compatible with the device of the invention.

The invention also provides for methods of producing an augmented image.

In preferred embodiments of the invention, a vision system method comprising: an acquire step, a conversion step, a position determining step, an attitude determining step, a data recall step, a processing step, and a display step; wherein the imaging step the objects of a scene are imaged onto a two dimensional plane as the light emanating from the objects propagates through at least one lens and forms the image at the plane, wherein the digitizing step the two dimensional optical input is converted into an electrical signal, wherein the position determining step the position of the camera is determined with respect to some arbitrary reference point, wherein the attitude determining step the attitude of the camera is determined with respect to some arbitrary direction, wherein the data recall step data from a data base is recalled in accordance with the measurements of the previous two steps, wherein the processing step the image of the digitizing step and the data of the data recall step are combined to form a final image, and wherein the display step the final electronic image is converted to an optical image and displayed such that it is aligned to and corresponds with the real scene, is provided. A detailed description of each of the main method steps follows.
the acquire step In the acquire step, a camera of the device is pointed in the direction of a scene and a photon image is formed by a lens. The photon image is formed onto an electronic device that has been placed into the image plane of the camera lens. The desired field of view can be changed with the zoom function of the lens to selectively choose portions of a scene. The acquire step is likely to be continuous in preferred embodiments and pointing at various objects will result in a continuously updated display. Real-time functions such as "panning" in which many acquire steps occurs in rapid succession, are completely anticipated. The acquire step can be user influenced. If a pre-selected range is chosen by way of a user input, the computer can accommodate and adjust the lens in accordance with that input. This becomes more clear in the example where the user wishes to see the features of a distant object but the automatic ranging is keying on some object in the foreground. A selected range can eliminate acquisition of undesirable foreground objects.
the converting step The method of the invention distinguishes itself from methods such as HUDs and HMDs in that a photon representation of a scene is converted into an electronic signal that can be processed by a digital computer. The image of the real scene can be converted into image frames at standard video rates. In this way, changes are not required to existing video equipment and that equipment can be easily integrated into systems of the invention. The digital signal of a CCD is particularly desirable because a great deal of processing hardware compatible with CCDs already exists in the art. The pixel representation of images of CCD devices is also compatible with the pixel representation of images of LCD displays. The digital image of the CCD can be directly transmitted to the computer processor routines.
the determine position step The position of the camera can be determined in global (macro) applications with GPS methods and in microscopic applications with a laser interferometer. The positioning step is used to locate the camera with respect to an arbitrary point and to relay the result of that measurement to the computer such that the computer can identify where in the data base the information that corresponds to the scene that the camera is addressing is located.
the determine attitude step The attitude of the camera optical axis with respect to all three axis of rotation is measured to identify the direction the camera is pointed thereby further identifying what scene the camera is addressing and what appears in the camera field of view. The attitude figure typically drives one of the data store pointer variables and thereby, when in combination with a position figure, uniquely selects data stored therein. Attitude can be realized differently in various applications. In marine applications, "heading" and an implied horizon can uniquely define a scene. This is considered a special case of attitude on all three axis of rotation. It many applications, altitude will need to be considered for a scene to be properly identified. The primary function of the position and attitude steps are to give the computer enough information to unambiguously identify a scene.
the recall recorded data step Having made a position and attitude determination, the minimum amount of information needed to specify a location in the data base is realized. For some simple applications, this is enough information to recall stored data that can be combined with a real image produced by a camera looking into a scene located by the position and attitude measurements. In advanced applications, other factors such as range to object and magnification, may also need to be specified to specie the data to be recalled. The data after being recalled is transmitted to the processor to be combined with real image data.
the processing step Real image data are received into the processor from the converting step and augmentation data is received into the processor from the data recall step. Feature recognition techniques and image manipulation routines are applied to two forms of information to finally yield an image that is a desired combination of the two. Certain undesirable information can be removed from the image of the real scene. Important information not appearing in the image of the real scene, but found in the data can be enhanced in the final image.
display augmented image A augmented real image comprised of real image information and data from the data store is assembled in the processor and transmitted in standard video format to a display device. The final image is then displayed in accurate alignment with the real scene in a way that allows the viewer to "see" objects and features, otherwise invisible in other vision systems, in perfect orientation with the real scene. Augmented real images can be generated at video rates giving a display that provides a real-time view of reality with computer generated augmentation combined therewith.

Although the present invention has been described in considerable detail with reference to certain preferred versions thereof, other versions are possible. Therefore, the spirit and scope of the appended claims should not be limited to the description of the versions contained herein.

In accordance with each of the preferred embodiments of the invention, there is provided an apparatus for and method of realizing a vision system. It will be appreciated that each of the embodiments described include both an apparatus and method, and that the apparatus and method of one preferred embodiment may be different than the apparatus and method of another embodiment.

What is claimed is:

1. An electro-optic apparatus for producing an augmented image from an image of a real scene and a computer generated image, the augmented image being aligned to the scene such that the directions up, down, left and right of the augmented image correspond directly with up, down, left and right of the real scene and the normal direction of the image plane points in a direction away from the user and towards the scene, said augmented image being comprised of information generated by an imaging means and information recalled from a data store, the information being particular to the position as determined by the apparatus and attitude of the apparatus, which comprises:

an imaging means;
a position determining means;
an attitude determining means;
a data store;
a computer; and
a display, said imaging means having an optic axis which is a symmetry axis and defines the direction of viewing, a lens symmetric about that axis which defines an image field, and a charge coupled device in the image field;

said position determining means having a reference point corresponding to said imaging means;

said attitude determining means having a reference direction parallel to the direction of viewing of said imaging means;

said data store having memory locations wherein prerecorded data are stored, a plurality of orthogonal variables which identify those memory locations, and a pointer responsive to values from the position and attitude determining means which selects particular memory locations containing particular prerecorded data corresponding to the real scene;

said computer being in electronic communication with said imaging means, position and attitude determining means, data base, and display, having graphics and image processing capabilities; and said display being an elecro-optic emissive display having a normal direction orthogonal to the display plane, the normal direction being colinear with the symmetry axis of the imaging means and being in communication with said computer.

2. The apparatus in claim 1 where the display is integrated into a binocular type viewing device having an optical path which corresponds to each of two eyes.

3. The apparatus of claim 1 further comprising an optics system of lenses to image the display at optical infinity to give the user the appearance and feeling of actually looking at the real scene as opposed to looking at a display device in the near field thereby allowing the user to relax the eye muscles by focusing at infinity.

4. The apparatus of claim 1 said computer being responsive to image features of the real scene as indicated by some predetermined condition.

5. An electro-optic apparatus for producing an augmented image from an image of a real scene and a computer generated image, the augmented image being aligned to the scene such that the directions up, down, left and right of the augmented image correspond directly with up, down, left and right of the real scene and the normal direction of the image plane points in a direction away from the user and towards the scene, said augmented image being comprised of information of generated by an imaging means and information recalled from a data store, the information being particular to the position as determined by the apparatus and attitude of the apparatus, which comprises:

an imaging means;
 a position determining means;
 an attitude determining means;
 a data store;
 a computer; and
 a display,
 said imaging means being sensitive to photon input and operable for converting light into an electronic signal processable by said computer;
 said positioning determining means being operable for determining the location of the imaging means and presents a value which represents that location to the computer;
 said attitude determining means being operable for determining the attitude of the imaging means as defined by the axis of the imaging means and presents a value which represents that attitude to the computer;
 said data store being operable for storing prerecorded data corresponding to and representing objects known to be in the present field of view of the imaging means as defined by the present position and attitude thereof, recalling that data and transmitting it to the computer;
 said computer being operable for receiving signals from imaging means and data store and combining those signals such that a composite image signal is formed and further operable for transmitting the composite image to said display;
 said display being an elecro-optic emissive display operable for converting the composite image signal of the computer to a physical signal viewable by a user that is aligned to the viewing axis of said imaging means, the electro-optic vision apparatus allows the user to see his environment with computer generated augmented images aligned to the scene as the user would view the scene normally.

\* \* \* \* \*